(12) United States Patent
Lee et al.

(10) Patent No.: US 12,386,121 B2
(45) Date of Patent: Aug. 12, 2025

(54) COMMON PATH INTERFEROMETRIC PROBE

(71) Applicant: INDUSTRIAL TECHNOLOGY RESEARCH INSTITUTE, Hsinchu (TW)

(72) Inventors: Yuan Chin Lee, Hsinchu (TW); Chi Shen Chang, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 440 days.

(21) Appl. No.: 18/089,973

(22) Filed: Dec. 28, 2022

(65) Prior Publication Data
US 2024/0219646 A1    Jul. 4, 2024

(51) Int. Cl.
*G01B 9/02091*    (2022.01)
*G02B 6/32*    (2006.01)
(Continued)

(52) U.S. Cl.
CPC ........ *G02B 6/3624* (2013.01); *G01B 9/02091* (2013.01); *G02B 6/32* (2013.01); *G02B 23/2469* (2013.01)

(58) Field of Classification Search
CPC .... G02B 23/2469; G02B 6/32; G02B 6/3624; G01B 9/02091
See application file for complete search history.

(56) References Cited

U.S. PATENT DOCUMENTS

| 7,995,210 B2 | 8/2011 | Tearney et al. |
| 2008/0080060 A1* | 4/2008 | Messerschmidt .. G02B 23/2407 |
| | | 359/654 |

(Continued)

FOREIGN PATENT DOCUMENTS

| CN | 110742574 A | 2/2020 | |
| JP | 7116111 B2 * | 8/2022 | ........... A61B 5/0084 |
| TW | 201516495 A | 5/2015 | |

OTHER PUBLICATIONS

Taiwanese Office Action issued in corresponding application No. 111150276, dated Aug. 24, 2023.

*Primary Examiner* — Eric Wong
(74) *Attorney, Agent, or Firm* — Maschoff Brennan

(57) ABSTRACT

A common path interferometric probe for identifying a sample includes an optical fiber, a light guide component, a GRIN lens component and a beamsplitter surface. The optical fiber outputs a light beam. The optical fiber, the light guide component and the GRIN lens component are sequentially connected. The reflection surface is disposed on the light guide component and the beamsplitter surface disposed in the GRIN lens component. When the light beam output from the optical fiber travels through the light guide component and reaches the beamsplitter surface, a part of the light beam is reflected by the beamsplitter surface to form a reference beam, and another part of the light beam passes through the beamsplitter surface to form a sample beam. The reference beam travels back to the optical fiber by undergoing reflections at the reflection surface and beamsplitter surface. The sample beam reaches the sample after traveling through the GRIN lens component, and is reflected by the sample to travel back to the optical fiber.

13 Claims, 7 Drawing Sheets

(51) Int. Cl.
*G02B 6/36* (2006.01)
*G02B 23/24* (2006.01)

(56) References Cited

U.S. PATENT DOCUMENTS

| | | |
|---|---|---|
| 2008/0228033 A1* | 9/2008 | Tumlinson ......... A61B 1/00096 |
| | | 600/112 |
| 2010/0231909 A1 | 9/2010 | Trainer |
| 2010/0292539 A1 | 11/2010 | Lankenau et al. |
| 2014/0160482 A1 | 6/2014 | Tearney et al. |
| 2020/0000341 A1 | 1/2020 | Messerschmidt et al. |
| 2021/0223467 A1* | 7/2021 | Gregg .................. G02B 6/0281 |
| 2024/0210159 A1* | 6/2024 | Wang ................. G01B 9/02091 |

* cited by examiner

COMMON PATH INTERFEROMETRIC PROBE

TECHNICAL FIELD

This disclosure relates to a common path interferometric probe.

BACKGROUND

Conventionally, there are two light beams in an optical coherence tomography (OCT) system, one of them is a sample beam, and the other is a reference beam. When path lengths of the two light beams are equal to each other, there would be interference signals generated for identifying tissues or samples.

A fiber optic OCT probe can be used for imaging of trachea or brain tissue. However, during operation, an optical path difference between the two light beams may be varied due to movement or bending of the optical fiber, thereby resulting in bad image quality or failures in imaging. Moreover, due to manufacturing deviations, there are some degrees of differences between the lengths of the optical fibers of the manufactured probes. Therefore, when the probe is replaced with a new one, it is necessary to readjust the reference arm where the reference beam travels for the new probe, thus wasting more time and human resources.

To address the above problem, a common-path probe is developed by manufacturers for preventing optical path difference between the two light beams from being varied due to movement or bending of the optical fiber. However, in general, in a conventional common-path probe, a partial reflection surface is a lens surface of a gradient-index lens (GRIN lens) located farthest away from the optical fiber. In such configuration, it is difficult to compensate the optical path difference between the two light beams, thus affecting the image quality. In addition, it is required to obtain a balance among parameters, such as the refractive index of the GRIN lens, the length of the GRIN lens, the distance between the GRIN lens and the optical fiber, and the object distance between the probe and the sample, so as to ensure the focusing of the sample beam on the end facet of the optical fiber. However, it is difficult to ensure that the reference beam can be focused on the end facet of the optical fiber at the same time. Therefore, the focusing spot of the reference beam on the end facet of the optical fiber is too large, resulting in low reference beam collection efficiency.

SUMMARY

One embodiment of the disclosure provides a common path interferometric probe for identifying a sample, and the common path interferometric probe includes an optical fiber, a light guide component, a GRIN lens component, a reflection surface and a beamsplitter surface. The optical fiber has a light transceive end facet, and the optical fiber is configured to output a light beam through the light transceive end facet. The light guide component is configured to transmit the light beam and has a first connection end surface and a second connection end surface opposite to each other, and the light transceive end facet of the optical fiber is connected to the first connection end surface. The GRIN lens component is configured to focus the light beam and includes a collimation part and a focusing part connected to each other, and the focusing part is located farther away from the light guide component than the collimation part to the light guide component. The GRIN lens component has a joint surface located at one side of the collimation part located farthest away from the focusing part, and the joint surface is connected to the second connection end surface of the light guide component. The reflection surface is disposed on the first connection end surface of the light guide component and located on one side of the light transceive end facet, and the reflection surface is configured to reflect a reference beam. The beamsplitter surface is disposed in the collimation part and substantially located at half length of the collimation part. The beamsplitter surface and the reflection surface are disposed facing each other, and the beamsplitter surface is configured to reflect the reference beam and allow a sample beam to pass through. In addition, when the light beam output from the light transceive end facet of the optical fiber travels through the light guide component and reaches the beamsplitter surface, a part of the light beam is reflected by the beamsplitter surface to form the reference beam, and another part of the light beam passes through the beamsplitter surface to form the sample beam. The reference beam travels back to the light transceive end facet by undergoing reflections at the reflection surface and the beamsplitter surface. The sample beam reaches the sample after traveling through the GRIN lens component, and then the sample beam is reflected by the sample and travels back to the light transceive end facet The above descriptions about the present disclosure and the detailed descriptions given hereinbelow are provided for demonstrating and explaining the principles of the disclosure, and for further explanation of the appended claims.

DETAILED DESCRIPTION

Aspects and advantages of the application will become apparent from the following detailed descriptions with the accompanying drawings. For purposes of explanation, one or more specific embodiments are given to provide a thorough understanding of the application, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

Figure 1:
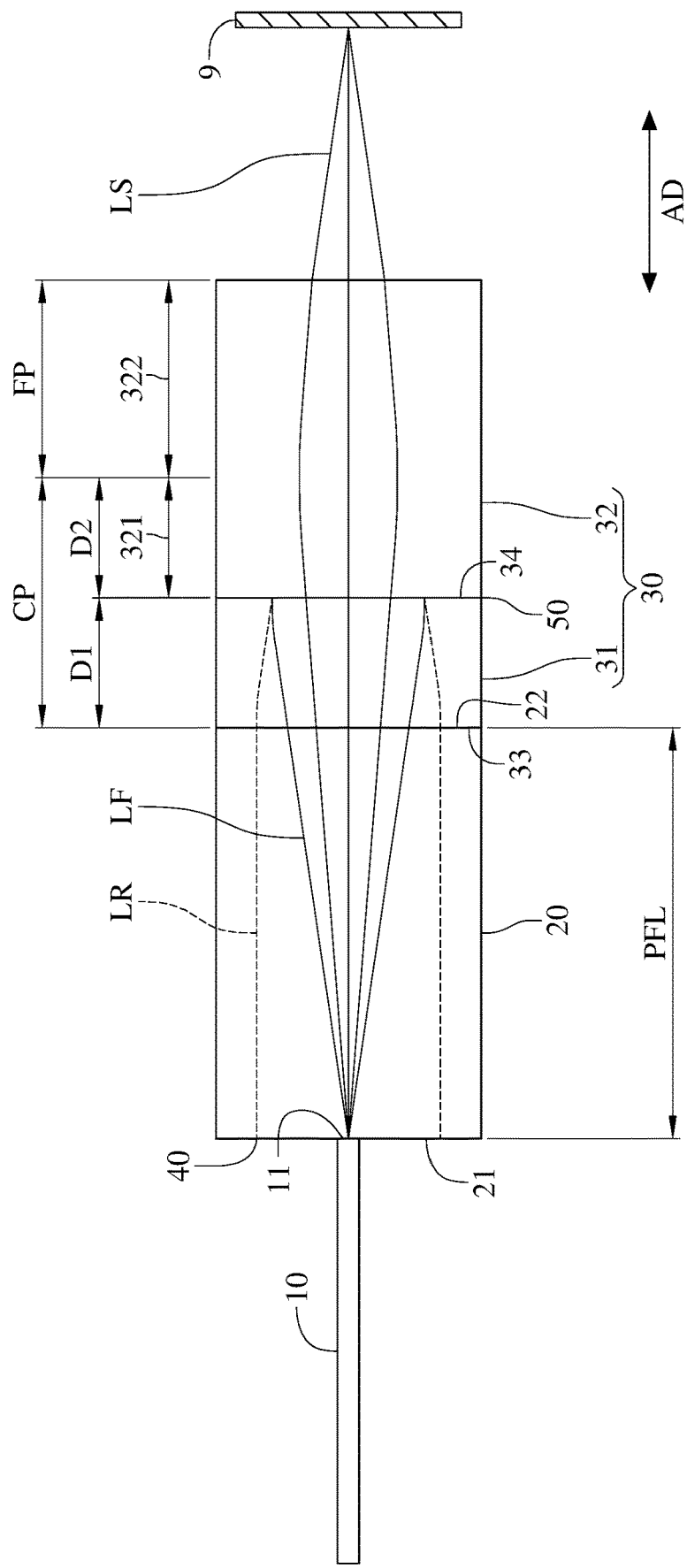
FIG. 1 is a schematic view of a common path interferometric probe and a sample in accordance with a first embodiment of the disclosure.
Figure 2:
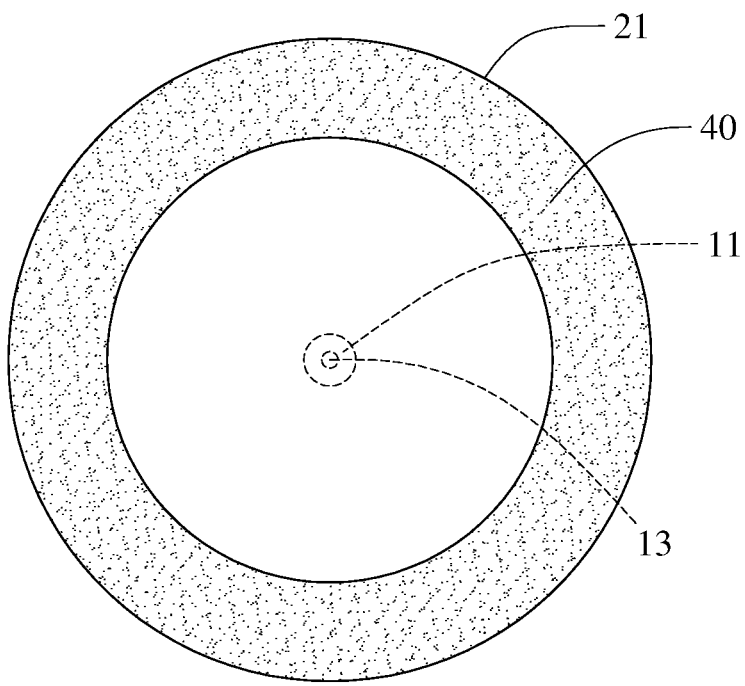
FIG. 2 is a front view of a first connection end surface, a light transceive end facet, a core end facet and a reflection surface in FIG. 1.
Figure 3:
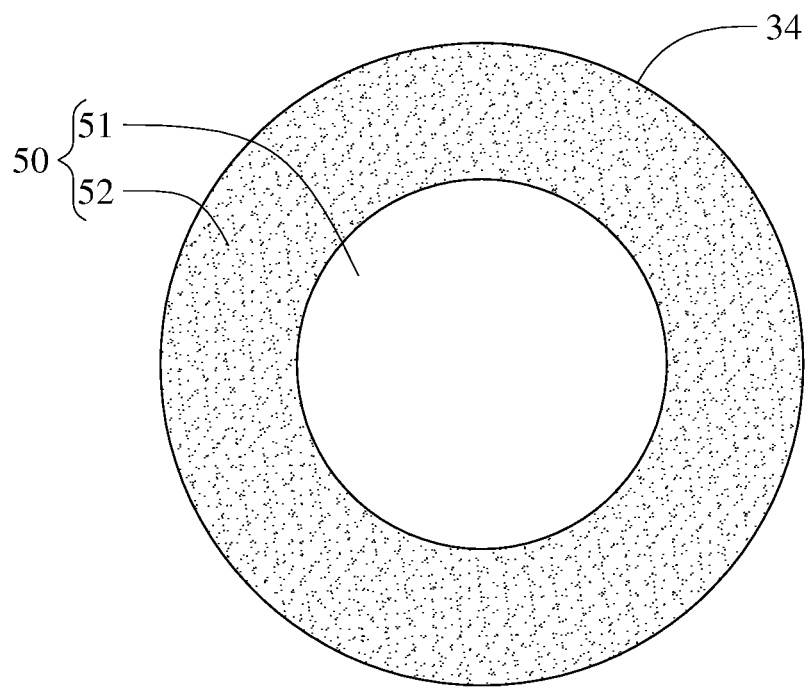
FIG. 3 is a front view of a beamsplitter surface in FIG. 1.

Please refer to FIG. 1 to FIG. 3. FIG. 1 is a schematic view of a common path interferometric probe and a sample in accordance with a first embodiment of the disclosure, FIG. 2 is a front view of a first connection end surface, a light transceive end facet, a core end facet and a reflection surface in FIG. 1, and FIG. 3 is a front view of a beamsplitter surface in FIG. 1.

In this embodiment, a common path interferometric probe 1 is for identifying a sample 9, and the common path interferometric probe 1 includes an optical fiber 10, a light guide component 20, a GRIN lens component 30, a reflection surface 40 and a beamsplitter surface 50.

The optical fiber 10 has a light transceive end facet 11, and the optical fiber 10 is configured to output a light beam LF through the light transceive end facet 11, where a wavelength of the light beam LF is, for example, in a range from 0.84 µm to 1.37 µm. In this embodiment, the optical fiber 10 is a single mode optical fiber, and the optical fiber 10 has a core end facet 13 located at an axial region of the light transceive end facet 11, The core end facet 13 is configured to output and receive the light beam LF. However, the optical fiber of the disclosure is not limited to being a single mode optical fiber. In other embodiments, an optical fiber may be a multi-mode optical fiber.

The light guide component 20 is configured to transmit the light beam LF and has a first connection end surface 21 and a second connection end surface 22 opposite to each other. The light transceive end facet 11 of the optical fiber 10 is connected to the first connection end surface 21. In addition, an area of the first connection end surface 21 is larger than an area of the light transceive end facet 11. The light guide component 20 is composed of an optical transmission component. In one configuration, the light guide component 20 may be a coreless fiber or a rod lens, and the present disclosure is not limited thereto.

The GRIN lens component 30 is configured to focus the light beam LF and includes a collimation part CP and a focusing part FP connected to each other, and the focusing part FP is located farther away from the light guide component 20 than the collimation part CP to the light guide component 20. The GRIN lens component 30 has a joint surface 33 located at one side of the collimation part CP located farthest away from the focusing part FP, and the joint surface 33 is connected to the second connection end surface 22 of the light guide component 20. In addition, after the light beam LF leaves the collimation part CP, the light beam LF becomes a parallel light beam and enters the focusing part FP.

In this embodiment, the GRIN lens component 30 includes a first GRIN lens 31 and a second GRIN lens 32 which are coaxially arranged. The second GRIN lens 32 is located farther away from the light guide component 20 than the first GRIN lens 31 to the light guide component 20, the second GRIN lens 32 is connected to the first GRIN lens 31, and there is a connection surface 34 located between the first GRIN lens 31 and the second GRIN lens 32. Furthermore, the second GRIN lens 32 includes a first part 321 and a second part 322. The first part 321 is connected to the first GRIN lens 31, and an axial length of the first part 321 is substantially equal to an axial length of the first GRIN lens 31 in an axial direction AD. In addition, the collimation part CP is composed of the first part 321 and the first GRIN lens 31. In such configuration, the joint surface 33 is located at one side of the first GRIN lens 31 located farthest away from the second GRIN lens 32, and the connection surface 34 is located between the first GRIN lens 31 and the first part 321 of the second GRIN lens 32. Said axial length of the first part 321 of the second GRIN lens 32 being "substantially" equal to the axial length of the first GRIN lens 31 in the axial direction AD refers to that the axial lengths of them in the axial direction AD are the same, or that the axial lengths of them in the axial direction AD may differ from each other by at most 15% due to, for example, manufacturing deviations.

The reflection surface 40 is disposed on the first connection end surface 21 of the light guide component 20 and located on one side of the light transceive end facet 11, and the reflection surface 40 is configured to reflect a reference beam LR. In this embodiment, the light transceive end facet 11 of the optical fiber 10 is connected to a paraxial region of the first connection end surface 21 of the light guide component 20, the reflection surface 40 is an annular reflection surface located at an off-axis region of the first connection end surface 21, and the reflection surface 40 surrounds the light transceive end facet 11. A reflectivity of the reflection surface 40 may be 100% or close to 100%, but the present disclosure is not limited thereto. In other embodiments, a reflectivity of a reflection surface may be larger than 50% and smaller than or equal to 100% according to actual requirements.

The beamsplitter surface 50 is disposed in the collimation part CP and substantially located at half length of the collimation part CP, and the beamsplitter surface 50 is configured to reflect the reference beam LR and allow a sample beam LS to pass through. Furthermore, the beamsplitter surface 50 is disposed on the connection surface 34 located between the first GRIN lens 31 and the second GRIN lens 32, and the beamsplitter surface 50 and the reflection surface 40 are disposed facing each other. Said half length of the collimation part CP refers to half length of the collimation part CP in the axial direction AD, and it can also be interpreted as a middle position of the collimation part CP in the axial direction AD. In addition, said beamsplitter surface 50 being "substantially" located at half length of the collimation part CP refers to that a distance D1 from the beamsplitter surface 50 to the joint surface 33 is equal to a distance D2 from the beamsplitter surface 50 to an interface between the collimation part CP and the focusing part FP, or that the distance D1 from the beamsplitter surface 50 to the joint surface 33 and the distance D2 from the beamsplitter surface 50 to the interface between the collimation part CP and the focusing part FP may differ from each other by at most 15% due to, for example, manufacturing deviations.

In this embodiment, as shown in FIG. 3, the beamsplitter surface 50 has a light transmission region 51 and a reflection region 52. The light transmission region 51 is located at a paraxial region (e.g., an inner circular region) of the beamsplitter surface 50, and the reflection region 52 is located at an off-axis region (e.g., an outer annular region) of the beamsplitter surface 50. When the light beam LF output from the light transceive end facet 11 of the optical fiber 10 travels through the light guide component 20 and enters the first GRIN lens 31 of the GRIN lens component 30 (or a front half part of the collimation part CP), the light beam LF is collimated and then is split by the beamsplitter surface 50. In specific, a part of the light beam LF reaching the light transmission region 51 passes through the beamsplitter surface 50 to form the sample beam LS entering the second GRIN lens 32, and another part of the light beam LF reaching the reflection region 52 is reflected by the reflection region 52 to form the reference beam LR. Furthermore, the reflection region 52 of the beamsplitter surface 50 is an annular reflection surface, and the reflection region 52 surrounds the light transmission region 51. In this embodiment, the beamsplitter surface 50 and the reflection surface 40 are parallel to each other and are both perpendicular to the axial direction AD.

By the above described arrangements, the light beam LF output from the light transceive end facet 11 can be split by the beamsplitter surface 50 into the reference beam LR and the sample beam LS. The reference beam LR can travel back to the light transceive end facet 11 by undergoing reflections respectively at the reflection surface 40 and the reflection region 52 of the beamsplitter surface 50. The sample beam LS can reach the sample 9 after traveling through the second GRIN lens 32 of the GRIN lens component 30, and then be reflected by the sample 9 to travel back to the light transceive end facet 11.

In detail, as shown in FIG. 1, the light beam LF output from the core end facet 13 at the light transceive end facet 11 travels toward and reaches the beamsplitter surface 50 disposed in the collimation part CP, and then is split by the beamsplitter surface 50 into the reference beam LR and the sample beam LS. The reference beam LR is collimated by the collimation part CP to be a collimated light beam having parallel light rays traveling toward the reflection surface 40, then reflected by the reflection surface 40 to travel back to the reflection region 52 of the beamsplitter surface 50, and then reflected by the reflection region 52 of the beamsplitter surface 50 again and focused on the core end facet 13 at the light transceive end facet 11 by the collimation part CP. On the other hand, the sample beam LS is focused on the sample 9 by the collimation part CP and the focusing part FP of the GRIN lens component 30, then reflected by the sample 9 to travel through the GRIN lens component 30, and then passing through the light transmission region 51 and focused on the core end facet 13 at the light transceive end facet 11.

It is worth noting that since the beamsplitter surface 50 is located at half length of the collimation part CP, the reference beam LR travels from the beamsplitter surface 50 to the light guide component 20 at the distance D1, the sample beam LS travels from the beamsplitter surface 50 to the focusing part FP at the distance D2, and the distance D1 is equal to the distance D2. Therefore, the reference beam LR and the sample beam LS are both collimated light beams having parallel rays as they leave the collimation part CP for the first time.

In this embodiment, the reflection region 52 of the beamsplitter surface 50 is formed by an annular coating with which the connection surface 34 is coated at an off-axis region thereof, but the present disclosure is not limited thereto. In other embodiments, the reflection region 52 may be formed by a reflection component, such as a mirror, disposed at the off-axis region of the connection surface 34. In addition, a reflectivity of the reflection region 52 may be 100% or close to 100%, but the present disclosure is not limited thereto. In other embodiments, a reflectivity of a reflection region may be larger than or equal to 50% and smaller than 100% according to actual design requirements.

A proportion of the reflection surface 40 to the rest part of the first connection end surface 21 as shown in FIG. 2 is only exemplary, and the present disclosure is not limited thereto. In other embodiments, a proportion of a reflection surface may be different from that as shown in FIG. 2 according to actual design requirements. Similarly, a proportion of the light transmission region 51 to the reflection region 52 of the beamsplitter surface 50 as shown in FIG. 3 is only exemplary, and the present disclosure is not limited thereto. In other embodiments, a proportion of a light transmission region to a reflection region of a beamsplitter surface may be different from that as shown in FIG. 3 according to actual design requirements.

As shown in FIG. 1, a light path route of the sample beam LS starting from the beamsplitter surface 50 to the sample 9 sequentially passes through a rear half part of the collimation part CP of the GRIN lens component 30 (i.e., a half part of the collimation part CP located farther away from the light guide component 20), the focusing part FP (i.e., the second GRIN lens 32) and an air gap between the GRIN lens component 30 and the sample 9. Therefore, half of an optical path length L1 of the sample beam LS (including the light beam LF part) is a sum of an optical path length FL of the light beam LF traveling through the light guide component 20, an optical path length DL through the collimation part CP, an optical path length EL through the focusing part FP and an optical path length WL through the air gap between the GRIN lens component 30 and the sample 9 (i.e., L1=FL+DL+EL+WL). In addition, the air gap between the GRIN lens component 30 and the sample 9 can be considered as a working distance of the common path interferometric probe 1.

On the other hand, a light path route of the reference beam LR starting from the beamsplitter surface 50 to the reflection surface 40 sequentially passes through the front half part of the collimation part CP of the GRIN lens component 30 (i.e., a half part of the collimation part CP located closer to the light guide component 20) and the light guide component 20. That is, because of the function of the reflection surface 40, the reference beam LR travels through the light guide component 20 and the front half part of the collimation part CP two times in the light path route thereof. Therefore, half of an optical path length L2 of the reference beam LR (including the light beam LF part) is a sum of the optical path length FL of the light beam LF traveling through the light guide component 20, an optical path length 0.5DL through the front half part of the collimation part CP, an optical path length 0.5DL of the reference beam LR traveling through the front half part of the collimation part CP and the optical path length FL through the light guide component 20 (i.e., L2=FL+0.5DL+0.5DL+FL).

As can be known from the above descriptions, half of an optical path length difference ΔOPL between the reference beam LR and the sample beam LS is a difference between half of the optical path length L2 of the reference beam LR and half of the optical path length L1 of the sample beam LS, and that is ΔOPL=L2−L1=(FL+0.5DL+0.5DL+FL)−(FL+DL+EL+WL)=FL−(EL+WL), wherein defining (EL+WL) is an optical path length to be compensated (hereinafter compensated optical path length), and FL is a compensating optical path length, where EL is an optical path length of the sample beam LS traveling through the focusing part FP, WL is an optical path length of the sample beam LS traveling through the air gap between the GRIN lens component 30 and the sample 9, and FL is an optical path length of the light beam LF traveling through the light guide component 20.

According to the present disclosure, in a design phase, by adjusting physical lengths of components and the working distance of the common path interferometric probe 1 based on the arrangements of refractive indices of components, such as the light guide component 20 and the GRIN lens component 30, in the common path interferometric probe 1, the compensating optical path length (i.e., FL) is substantially equal to the compensated optical path length (i.e., EL+WL), so that the purpose of fully (or nearly fully) optical path length compensation can be achieved. Thus, the optical path lengths of the reference beam LR and the sample beam LS are substantially identical (i.e., half of the optical path length difference ΔOPL between the reference beam LR and the sample beam LS is equal to 0). Therefore, the compensated optical path length of the sample beam LS can be effectively compensated, and a focusing spot of the reference beam LR can be effectively focused, thereby improving the reference beam LR collection efficiency.

The following paragraphs introduce one of multiple examples and ranges of optical parameters and condition settings of the example of the common path interferometric probe 1.

Firstly, the ranges of optical parameters and condition settings include:
1. the wavelength of the light beam LF output from the optical fiber 10 is in a range between 1.31±0.06 μm;
2. the light guide component 20 is a fused silica coreless fiber, where the refractive index of the fused silica coreless fiber would be 1.44680, 1.44612 and 1.44748 respectively corresponding to a center wavelength 1.31 μm of the light beam LF and two boundary wavelengths 1.37 μm and 1.25 μm of the light beam LF; and
3. each of the first GRIN lens 31 and the second GRIN lens 32 is a SLW-1.8 GRIN lens, where the refractive index of the SLW-1.8 GRIN lens would be 1.59154, 1.59114 and 1.59201 respectively corresponding to a center wavelength 1.31 μm of the light beam LF and two boundary wavelengths 1.37 μm and 1.25 μm of the light beam LF.

In the design of the common path interferometric probe 1, firstly, a physical length of the focusing part FP of the GRIN lens component 30 is determined to be 2.332 mm, and a distance of the air gap (i.e., working distance) between the GRIN lens component 30 and the sample 9 is determined to be 2.0 mm. Then, the refractive index of the second GRIN lens 32 is 1.59154 corresponding to the center wavelength 1.31 μm of the light beam LF, and based on that, the compensated optical path length (EL+WL) can be calculated to be approximately 5.711 mm; that is, EL+WL=2.332 mm×1.59154+2.0 mm=5.711 mm.

Then, according to the present disclosure, based on the features that the compensating optical path length (FL) is substantially equal to the compensated optical path length (EL+WL), and the refractive index of the light guide component 20 is 1.44680 corresponding to the center wavelength 1.31 μm of the light beam LF, a physical length PFL of the light guide component 20 can be obtained as 3.947 mm by using the equation of FL=EL+WL=5.711 mm; that is, FL=PFL×1.44680=5.711 mm, so PFL=5.711 mm/1.44680=3.947 mm.

Lastly, based on the calculated value (which is 3.947 mm) of the physical length PFL of the light guide component 20, a physical length of the collimation part CP can be simulated as 1.873 mm.

In this embodiment, since a physical length of the first GRIN lens 31 is half of the physical length of the collimation part CP, the physical length of the first GRIN lens 31 is 0.9365 mm. In addition, since a physical length of the first part 321 of the second GRIN lens 32 is half of the physical length of the collimation part CP, and a physical length of the second part 322 of the second GRIN lens 32 is the physical length of the focusing part FP, a physical length of the second GRIN lens 32 is 3.2685 mm (i.e., 0.9365 mm+2.332 mm=3.2685 mm).

The arrangements of the above example of the common path interferometric probe 1 ensure that in the whole wavelength range between 1.31±0.06 μm of the light beam LF, the effect of fully (or nearly fully) optical path length compensation can be achieved.

In specific, regarding one of the boundary wavelengths (1.37 μm) of the light beam LF, the compensated optical path length (EL+WL) thereof is approximately 5.711 mm (i.e., 2.332 mm×1.59114+2.0 mm=5.711 mm), and the compensating optical path length (FL) thereof is approximately 5.709 mm (i.e., 3.947 mm×1.44612=5.709 mm), and thus, a difference between the compensating optical path length (FL) and the compensated optical path length (EL+WL) is 0.002 mm, which is much smaller than the working distance (2.0 mm) of the common path interferometric probe 1. Accordingly, for the boundary wavelength of 1.37 μm of the light beam LF in the common path interferometric probe 1, the effect of nearly fully optical path length compensation can also be achieved.

On the other hand, regarding the other of the boundary wavelengths (1.25 μm) of the light beam LF, the compensated optical path length (EL+WL) thereof is approximately 5.713 mm (i.e., 2.332 mm×1.59201+2.0 mm=5.713 mm), and the compensating optical path length (FL) thereof is approximately 5.715 mm (i.e., 3.947 mm×1.44748=5.715 mm), and thus, a difference between the compensating optical path length (FL) and the compensated optical path length (EL+WL) is 0.002 mm, which is much smaller than the working distance (2.0 mm) of the common path interferometric probe 1. Accordingly, for the boundary wavelength of 1.25 μm of the light beam LF in the common path interferometric probe 1, the effect of nearly fully optical path length compensation can also be achieved.

By the above arrangements, the common path interferometric probe 1 as described in this embodiment realizes that the optical path length FL of the light beam LF (or the reference beam LR) traveling through the light guide component 20 is substantially equal to the optical path length (EL+WL) of the sample beam LS traveling from the interface between the collimation part CP and the focusing part FP to the sample 9; that is, the compensating optical path length (FL) is substantially equal to the compensated optical path length (EL+WL). It should be noted that said compensating optical path length (FL) being substantially equal to the compensated optical path length (EL+WL) refers to that a difference between the compensating optical path length (FL) and the compensated optical path length (EL+WL) is much smaller than the optical path length (i.e., working distance) from the common path interferometric probe 1 to the sample 9, and said "much smaller than" used herein refers to that a value is smaller than another value by two orders of magnitude (i.e., differing by a hundred times).

Furthermore, in the above described example, a coating area of the reflection region 52 of the beamsplitter surface 50 can be determined. In specific, the optical fiber 10 may be a SMF-28 single mode optical fiber, and a mode field diameter of which is 9.2 μm for the center wavelength 1.31 μm. Through calculation, in a case where the light beam LF with the center wavelength of 1.31 μm output from the optical fiber 10 reaches the second connection end surface 22 of the light guide component 20, a radius of a cross-section of the light beam LF on the second connection end surface 22 is approximately 0.244 mm. Considering that the wavelength range of the light beam LF is between 1.31±0.06 μm, when the light beam LF is considered as a Gaussian beam that approximately satisfies the Gaussian function, a part of the light beam LF projected on the second connection end surface 22 within a radius of 0.31 mm contains 96% of the energy of the entire Gaussian beam. Then, when the part of the light beam LF on the second connection end surface 22 within the radius of 0.31 mm reaches the beamsplitter surface 50, a corresponding radius of the part of the light beam LF projected on the beamsplitter surface 50 expands to 0.362 mm after the part of the light beam LF travels through the front half part of the collimation part CP. Accordingly, at the connection surface 34 where the beamsplitter surface 50 is disposed, a region outside the radius of 0.362 mm of the connection surface 34 is coated with a reflection film to form the reflection region 52, and thus, a region inside the radius of 0.362 mm of the connection surface 34 is the light transmission region 51. In such arrangement, the part of the light beam LF containing 96% of the energy of the light beam LF passes through to form the sample beam LS, while the rest part of the light beam LF is reflected to form the reference beam LR.

Figure 4:
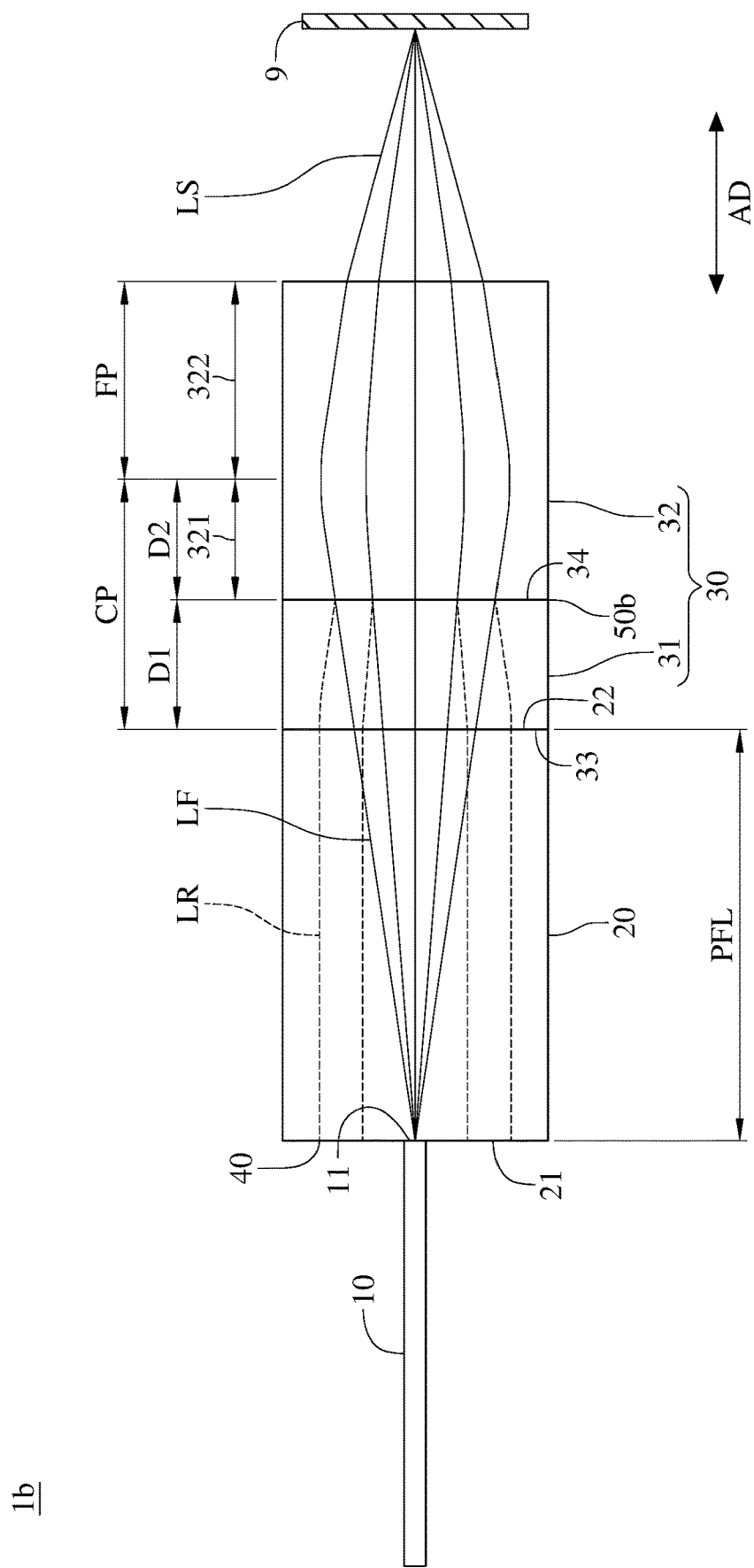
FIG. 4 is a schematic view of a common path interferometric probe and a sample in accordance with a second embodiment of the disclosure.
Figure 5:
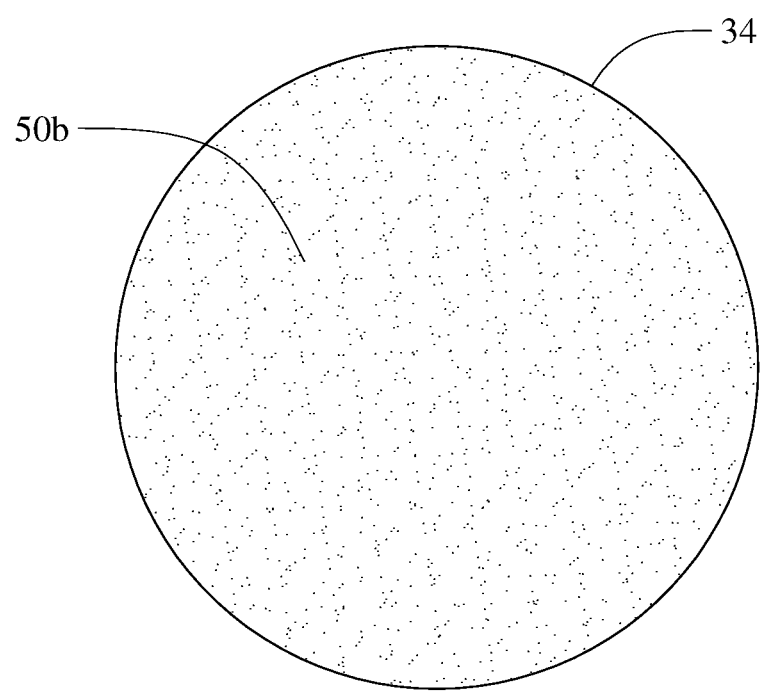
FIG. 5 is a front view of a beamsplitter surface in FIG. 4.

Please refer to FIG. 1, FIG. 4 and FIG. 5, where FIG. 4 is a schematic view of a common path interferometric probe and a sample in accordance with a second embodiment of the disclosure, and FIG. 5 is a front view of a beamsplitter surface in FIG. 4. In this embodiment (corresponding to FIG. 4), a common path interferometric probe 1b is similar to the common path interferometric probe 1 in FIG. 1 as described above. The same reference numerals indicate the same components, and functions and effects provided by those components are the same as described above, so an explanation in this regard will not be provided again.

In the common path interferometric probe 1 of the first embodiment, the beamsplitter surface 50 has the light transmission region 51 and the reflection region 52. However, in the common path interferometric probe 1b of the second embodiment, a beamsplitter surface 50b is a partial reflection surface entirely covering the connection surface 34. In addition, a reflectivity of the beamsplitter surface 50b may be larger than or equal to 4% and smaller than or equal to 50% according to actual design requirements, and the present disclosure is not limited thereto. In specific, since the beamsplitter surface 50b is a partial reflection surface, when the light beam LF output from the light transceive end facet 11 travels through the light guide component 20 and the first GRIN lens 31 and reaches the beamsplitter surface 50b, a part of the light beam LF is reflected by the beamsplitter surface 50b and another part of the light beam LF passes through the beamsplitter surface 50b to respectively form the reference beam LR and the sample beam LS. Accordingly, the formed reference beam LR is not only collimated and reaches the off-axis region (e.g., the outer annular region) of the first connection end surface 21 as in the first embodiment (corresponding to FIG. 1), but is collimated and reaches the whole first connection end surface 21. Therefore, the reflection surface 40 has a relatively large area and is almost entirely distributed on the first connection end surface 21 of the light guide component 20 except the region where the light transceive end facet 11 is located so as to prevent the decrease of collection efficiency of the reference beam LR.

In this embodiment, the beamsplitter surface 50b is formed by a coating with which the connection surface 34 is entirely coated, but the present disclosure is not limited thereto. In other embodiments, the beamsplitter surface 50b may be formed by a reflection component, such as a mirror, disposed at the connection surface 34.

Furthermore, based on the ranges of optical parameters and condition settings as described above, the reflectivity R of the beamsplitter surface 50b in this embodiment can be determined. In specific, assuming that the reflection surface 40 is almost entirely distributed on the first connection end surface 21 of the light guide component 20 except the region where the light transceive end facet 11 is located, a reflectivity of the reflection surface 40 is approximately 100%, a reflectivity of the sample 9 is 4%, and materials of the common path interferometric probe 1b have no absorbing properties, a proportion of the reference beam LR which can be received is approximately $R \times 100\% \times R = R^2$, and a proportion of the sample beam LS which can be received is approximately $(1-R) \times 4\% \times (1-R) = 0.04 \times (1-R)^2$, wherein R is the reflectivity of the beamsplitter surface 50b. When the intensity of the received reference beam LR and the intensity of the received sample beam LS are the same, a system using the common path interferometric probe 1b may obtain a maximum interferometric visibility. Therefore, by making the reference beam LR and the sample beam LS have equal proportion received (i.e., $R^2 = 0.04 \times (1-R)^2$), it can be obtained that when the reflectivity R of the beamsplitter surface 50b is approximately 16.7%, the common path interferometric probe 1b has a good interferometric visibility.

Figure 6:
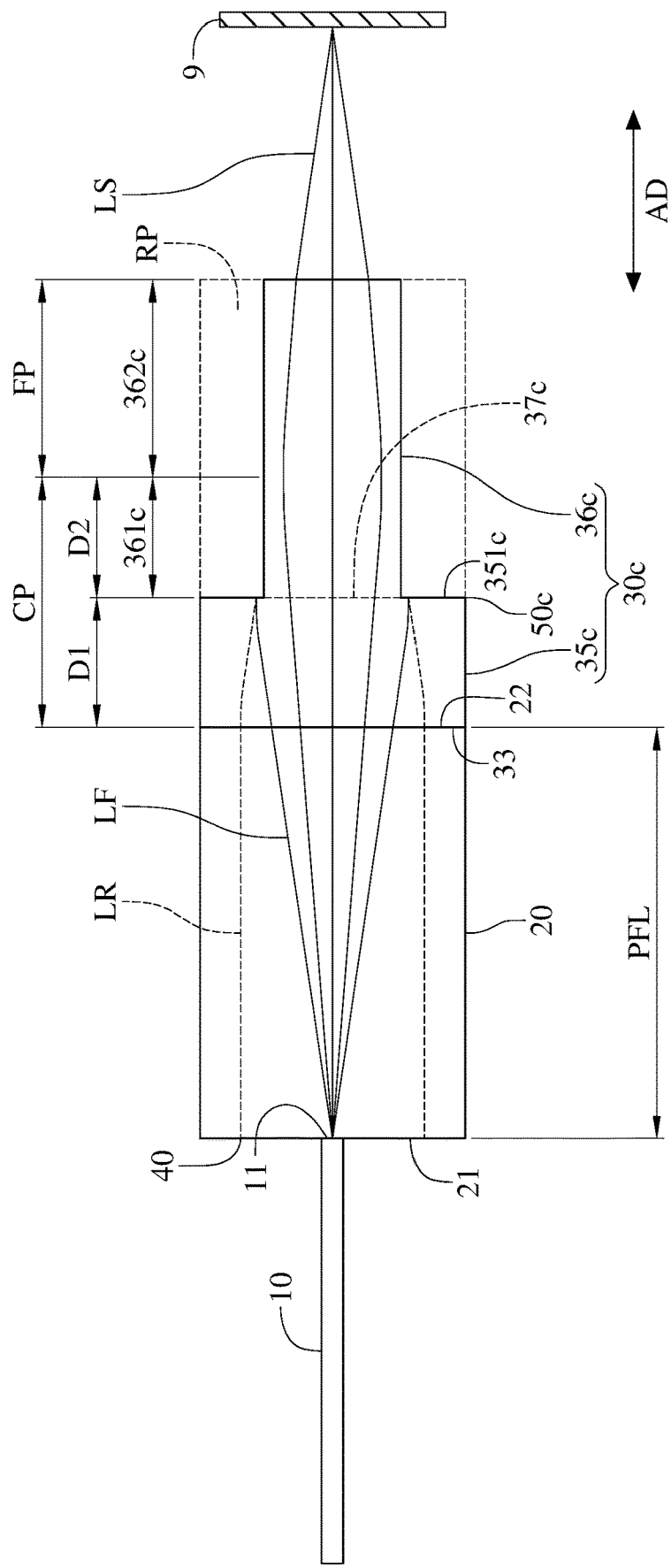
FIG. 6 is a schematic view of a common path interferometric probe and a sample in accordance with a third embodiment of the disclosure.
Figure 7:
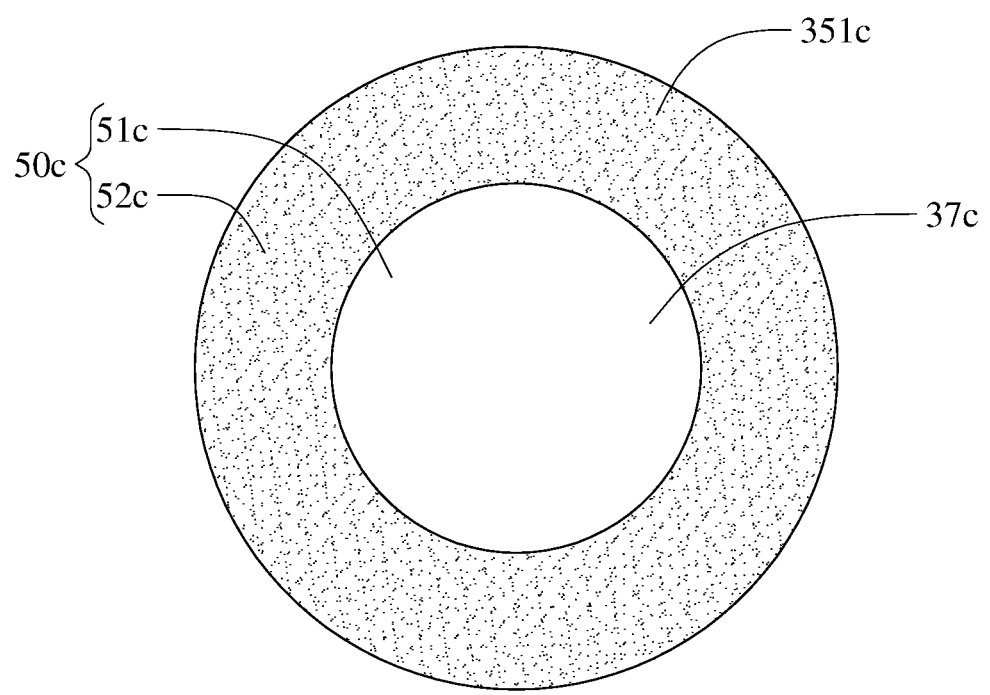
FIG. 7 is a front view of a beamsplitter surface and an annular surface in FIG. 6.

Please refer to FIG. 6 and FIG. 7. FIG. 6 is a schematic view of a common path interferometric probe and a sample in accordance with a third embodiment of the disclosure, and FIG. 7 is a front view of a beamsplitter surface and an annular surface in FIG. 6. In this embodiment (corresponding to FIG. 6), a common path interferometric probe 1c is similar to the common path interferometric probe 1 in FIG. 1 as described above. The same reference numerals indicate the same components, and functions and effects provided by those components are the same as described above, so an explanation in this regard will not be provided again.

It is worth noting that in this embodiment, a GRIN lens component 30c of a common path interferometric probe 1c includes a wide part 35c and a narrow part 36c which are made of a single piece. An outer diameter of the wide part 35c is larger than an outer diameter of the narrow part 36c, and the narrow part 36c is located farther away from the light guide component 20 than the wide part 35c to the light guide component 20. There is an interface 37c located between the narrow part 36c and the wide part 35c, and the wide part 35c has an annular surface 351c surrounding the interface 37c. In addition, the narrow part 36c includes a front part 361c and a rear part 362c which are connected to each other. The front part 361c is connected to the wide part 35c, an axial length of the front part 361c is substantially equal to an axial length of the wide part 35c in the axial direction AD, and the collimation part CP is composed of the front part 361c and the wide part 35c. In such configuration, the joint surface 33 is located at one side of the wide part 35c located farthest away from the narrow part 36c. Said axial length of the front part 361c of the narrow part 36c being "substantially" equal to the axial length of the wide part 35c in the axial direction AD refers to that the axial lengths of them in the axial direction AD are the same, or that the axial lengths of them in the axial direction AD may differ from each other by at most 15% due to, for example, manufacturing deviations.

A beamsplitter surface 50c is disposed in the collimation part CP and substantially located at half length of the collimation part CP, and the beamsplitter surface 50c is configured to reflect the reference beam LR and allow the sample beam LS to pass through. Furthermore, as shown in FIG. 7, the beamsplitter surface 50c has a light transmission region 51c and a reflection region 52c, the light transmission region 51c is located at the interface 37c between the wide part 35c and the narrow part 36c of the GRIN lens component 30c, and the reflection region 52c is located at the annular surface 351c of the wide part 35c, such that the reflection region 52c is an annular reflection surface surrounding the light transmission region 51c. In addition, since the mechanism of the light beam LF output from the optical fiber 10 being split into the sample beam LS and the reference beam LR and the light returning mechanism of the sample beam LS and the reference beam LR are the same as in the common path interferometric probe 1 described in the first embodiment, so an explanation in this regard will not be provided again. Accordingly, the light transmission region 51c is configured for the sample beam LS to pass through, and the reflection region 52c is configured to reflect the reference beam LR. In this embodiment, the beamsplitter surface 50c and the reflection surface 40 are disposed facing each other, and the beamsplitter surface 50c and the reflection surface 40 are parallel to each other and both perpendicular to the axial direction AD. Said half length of the collimation part CP refers to half length of the collimation part CP in the axial direction AD, and it can also be interpreted as a middle position of the collimation part CP in the axial direction AD. In addition, said beamsplitter surface 50c being "substantially" located at half length of the collimation part CP refers to that a distance D1 from the beamsplitter surface 50c to the joint surface 33 is equal to a distance D2 from the beamsplitter surface 50c to the interface between the collimation part CP and the focusing part FP, or that the distance D1 from the beamsplitter surface 50c to the joint surface 33 and the distance D2 from the beamsplitter surface 50c to the interface between the collimation part CP and the focusing part FP may differ from each other by at most 15% due to, for example, manufacturing deviations.

By the above described arrangements, the light beam LF output from the light transceive end facet 11 can be spilt by the beamsplitter surface 50c into the reference beam LR and the sample beam LS. The reference beam LR can travel back to the light transceive end facet 11 by undergoing reflections respectively at the reflection surface 40 and the reflection region 52c of the beamsplitter surface 50c. The sample beam LS of the light beam LF output from the light transceive end facet 11 can reach the sample 9 after traveling through the narrow part 36c of the GRIN lens component 30c, and then be reflected by the sample 9 to travel back to the light transceive end facet 11.

In this embodiment, the reflection region 52c of the beamsplitter surface 50c is formed by an annular coating with which the annular surface 351c is coated, but the present disclosure is not limited thereto. In other embodiments, the reflection region 52c may be formed by a reflection component, such as a mirror, disposed at the annular surface 351c. In addition, a reflectivity of the reflection region 52c may be 100% or close to 100%, but the present disclosure is not limited thereto. In other embodiments, a reflectivity of a reflection region may be larger than or equal to 50% and smaller than 100% according to actual design requirements.

In this embodiment, although the GRIN lens component 30c including the wide part 35c and the narrow part 36c made of a single piece is different from the GRIN lens component 30 of the first embodiment in shape, by comparing them, one can still realize that the function and optical parameter design of the wide part 35c and the narrow part 36c of the GRIN lens component 30c is the same as those of the first GRIN lens 31 and the second GRIN lens 32 of the GRIN lens component 30, so an explanation in this regard will not be provided again.

According to the design of optical parameters as described above in the first embodiment, in this embodiment, a physical length of the wide part 35c is 0.9365 mm, and a physical length of the narrow part 36c is 3.2685 mm (i.e., 0.9365 mm+2.332 mm=3.2685 mm). After the physical lengths of the wide part 35c and the narrow part 36c of the GRIN lens component 30c are determined and the outer diameter of the narrow part 36c is also determined according to actual design requirements, a portion of the GRIN lens component may be removed, for example, via an etching process to form the narrow part 36c (a space RP as shown in FIG. 6 schematically representing a space where the portion of the GRIN lens component to be removed via an etching process is located). As such, after the narrow part 36c is formed, the annular surface 351c is formed on the wide part 35c. Then, the annular surface 351c is coated with an annular coating to form the reflection region 52c of the beamsplitter surface 50c. Furthermore, said etching process may be a dry etching process or a wet etching process for example, but the present disclosure is not limited thereto. Moreover, in a wet etching process, a buffer solution containing ammonium fluoride and hydrofluoric acid ($NH_4F$+HF) may be used for etching a GRIN lens component, but the present disclosure is not limited thereto.

Furthermore, in the above described example, a coating area of the reflection region 52c of the beamsplitter surface 50c can be determined, and therefore, the outer diameter of the narrow part 36c can also be determined. In specific, the optical fiber 10 may be a SMF-28 single mode optical fiber, and a mode field diameter of which is 9.2 μm for the center wavelength 1.31 μm. Through calculation, in a case where the light beam LF with the center wavelength of 1.31 μm output from the optical fiber 10 reaches the second connection end surface 22 of the light guide component 20, a radius of a cross-section of the light beam LF on the second connection end surface 22 is approximately 0.244 mm. Considering that the wavelength range of the light beam LF is between 1.31±0.06 μm, when the light beam LF is considered as a Gaussian beam that approximately satisfies the Gaussian function, a part of the light beam LF projected on the second connection end surface 22 within a radius of 0.31 mm contains 96% of the energy of the entire Gaussian beam. Then, when the part of the light beam LF on the second connection end surface 22 within the radius of 0.31 mm reaches the beamsplitter surface 50c, a corresponding radius of the part of the light beam LF projected on the beamsplitter surface 50c expands to 0.362 mm after the part of the light beam LF travels through the front half part of the collimation part CP. Accordingly, the radius of the narrow part 36c is designed to be 0.362 mm so as to correspond to the light transmission region 51c of the beamsplitter surface 50c, and thus, an inner diameter of the annular surface 351c of the wide part 35c can be determined. On the other hand, since the interface 37c between the narrow part 36c and the wide part 35c defines the light transmission region 51c, a size of an outer diameter of the light transmission region 51c is a size of the outer diameter of the narrow part 36c. Accordingly, such range of the light transmission region 51c allows the part of the light beam LF containing 96% of the energy of the light beam LF to pass through to form the sample beam LS, while the rest part of the light beam LF is reflected by the reflection region 52c to form the reference beam LR.

Figure 8:
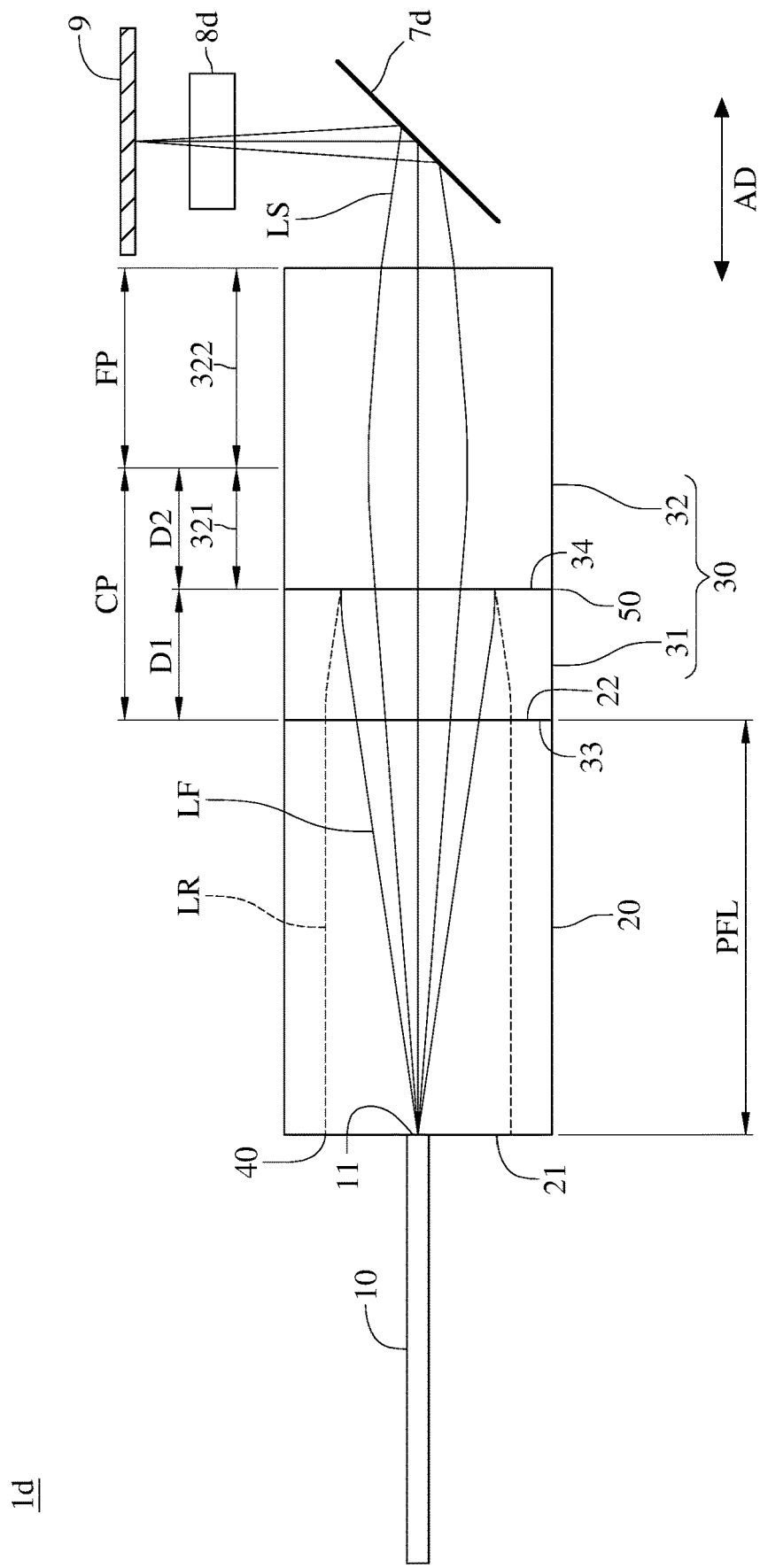
FIG. 8 is a schematic view of a common path interferometric probe and a sample in accordance with a fourth embodiment of the disclosure.

Please refer to FIG. 1 and FIG. 8, where FIG. 8 is a schematic view of a common path interferometric probe and a sample in accordance with a fourth embodiment of the disclosure. In this embodiment (corresponding to FIG. 8), a common path interferometric probe 1d is similar to the common path interferometric probe 1 in FIG. 1 as described above. The same reference numerals indicate the same components, and functions and effects provided by those components are the same as described above, so an explanation in this regard will not be provided again.

It is worth noting that in this embodiment, the common path interferometric probe 1d further includes a light folding component 7d and a cover glass 8d.

The light folding component 7d is disposed between the GRIN lens component 30 and the sample 9, and the light folding component 7d is configured to fold the sample beam LS. In this embodiment, the light folding component 7d is a mirror, but the present disclosure is not limited thereto. In other embodiments, light folding component may be a prism. The cover glass 8d is disposed between the light folding component 7d and the sample 9, and the cover glass 8d is configured to provide protection for the common path interferometric probe 1d from directly contacting the sample 9, and preventing foreign matters from entering the common path interferometric probe 1d.

By the above described arrangements, the light beam LF output from the core end facet 13 at the light transceive end facet 11 travels toward the beamsplitter surface 50 disposed in the collimation part CP and is split into the reference beam LR and the sample beam LS. The light path route of the reference beam LR in this embodiment is the same as that in the first embodiment, so an explanation in this regard will not be provided again. After the sample beam LS is collimated and focused by the second GRIN lens 32, the sample beam LS then reaches and is folded by the light folding component 7d, and thus, the sample beam LS changes its traveling direction toward the sample 9. Moreover, after the sample beam LS is folded, the sample beam LS travels through the cover glass 8d and is focused on the sample 9. Then, after the sample beam LS is reflected by the sample 9, the sample beam LS firstly travels through the cover glass 8d in the same path and reaches the light folding component 7d, folded by the light folding component 7d and changing its traveling direction toward the GRIN lens component 30, and finally back to the light transceive end facet 11.

As shown in FIG. 8, a light path route of the sample beam LS starting from the beamsplitter surface 50 to the sample 9 sequentially passes through a rear half part of the collimation part CP of the GRIN lens component 30 (i.e., a half part of the collimation part CP located farther away from the light guide component 20), the focusing part FP (i.e., the second GRIN lens 32), an air gap between the GRIN lens component 30 and the light folding component 7d, an air gap between the light folding component 7d and the cover glass 8d, the cover glass 8d and an air gap between the cover glass 8d and the sample 9. Therefore, half of an optical path length L1 of the sample beam LS (including the light beam LF part) is a sum of an optical path length FL of the light beam LF traveling through the light guide component 20, an optical path length DL through the collimation part CP, an optical path length EL through the focusing part FP, an optical path length AL1 through the air gap between the GRIN lens component 30 and the light folding component 7d, an optical path length AL2 through the air gap between the light folding component 7d and the cover glass 8d, an optical path length GL through the cover glass 8d, and an optical path length AL3 through the air gap between the cover glass 8d and the sample 9 (i.e., L1=FL+DL+EL+AL1+AL2+GL+AL3). In addition, the optical path length between the GRIN lens component 30 and the sample 9 can be considered as a working distance of the common path interferometric probe 1d (i.e., AL1+AL2+GL+AL3). On the other hand, the light path route of the reference beam LR in this embodiment is the same as that in the first embodiment, and this is, half of an optical path length L2 of the reference beam LR (including the light beam LF part) is a sum of the optical path length FL of the light beam LF traveling through the light guide component 20, an optical path length 0.5DL through the front half part of the collimation part CP, an optical path length 0.5DL of the reference beam LR traveling through the front half part of the collimation part CP and the optical path length FL through the light guide component 20 (i.e., L2=FL+0.5DL+0.5DL+FL).

As can be known from the above descriptions, half of an optical path length difference ΔOPL between the reference beam LR and the sample beam LS is a difference between half of the optical path length L2 of the reference beam LR and half of the optical path length L1 of the sample beam LS, and that is ΔOPL=L2−L1=(FL+0.5DL+0.5DL+FL)−(FL+DL+EL+AL1+AL2+GL+AL3)=FL−(EL+AL1+AL2+GL+AL3), wherein defining (EL+AL1+AL2+GL+AL3) is an optical path length to be compensated (hereinafter compensated optical path length), and FL is a compensating optical path length, where EL is an optical path length of the sample beam LS traveling through the focusing part FP, AL1 is an optical path length of the sample beam LS traveling through the air gap between the GRIN lens component 30 and the light folding component 7d, AL2 is an optical path length of the sample beam LS traveling through the air gap between the light folding component 7d and the cover glass 8d, GL is an optical path length of the sample beam LS traveling through the cover glass 8d, AL3 is an optical path length of the sample beam LS traveling through the air gap between the cover glass 8d and the sample 9, and FL is an optical path length of the light beam LF traveling through the light guide component 20.

According to the present disclosure, in a design phase, by adjusting physical lengths of components and the working distance of the common path interferometric probe 1d based on the arrangements of refractive indices of components, such as the light guide component 20 and the GRIN lens component 30, in the common path interferometric probe 1d, the compensating optical path length (i.e., FL) is substantially equal to the compensated optical path length (i.e., EL+AL1+AL2+GL+AL3), so that the purpose of fully (or nearly fully) optical path length compensation can be achieved. Thus, the optical path lengths of the reference beam LR and the sample beam LS are substantially identical (i.e., half of the optical path length difference ΔOPL between the reference beam LR and the sample beam LS is equal to 0). Therefore, the compensated optical path length of the sample beam LS can be effectively compensated, and a focusing spot of the reference beam LR can be effectively focused, thereby improving the reference beam LR collection efficiency.

The following paragraphs introduce one of multiple examples and ranges of optical parameters and condition settings of the example of the common path interferometric probe 1d.

Firstly, the ranges of optical parameters and condition settings include:
1. the wavelength of the light beam LF output from the optical fiber 10 is in a range between 0.88±0.04 μm;
2. the light guide component 20 is a fused silica coreless fiber, where the refractive index of the fused silica coreless fiber would be 1.45190, 1.45147 and 1.45266 respectively corresponding to a center wavelength 0.88

μm of the light beam LF and two boundary wavelengths 0.92 μm and 0.84 μm of the light beam LF;

3. each of the first GRIN lens 31 and the second GRIN lens 32 is a SLW-2.0 GRIN lens, where the refractive index of the SLW-2.0 GRIN lens would be 1.59731, 1.59642 and 1.59834 respectively corresponding to a center wavelength 0.88 μm of the light beam LF and two boundary wavelengths 0.92 μm and 0.84 μm of the light beam LF; and 4. the material of the cover glass 8d is polymethyl methacrylate (PMMA), where the refractive index of polymethyl methacrylate would be 1.48458, 1.48408 and 1.48515 respectively corresponding to a center wavelength 0.88 μm of the light beam LF and two boundary wavelengths 0.92 μm and 0.84 μm of the light beam LF.

In the design of the common path interferometric probe 1d, firstly, a physical length of the focusing part FP of the GRIN lens component 30 is determined to be 2.247 mm, a distance of the air gap between the GRIN lens component 30 and the light folding component 7d is determined to be 1.5 mm, a distance of the air gap between the light folding component 7d and the cover glass 8d is determined to be 0.8 mm, a physical length of the cover glass 8d is determined to be 0.2 mm, and a distance of the air gap between the cover glass 8d and the sample 9 is determined to be 0.5 mm. Then, the refractive index of the second GRIN lens 32 is 1.59731 and the refractive index of the cover glass 8d is 1.48458 corresponding to the center wavelength 0.88 μm of the light beam LF, and based on that, the compensated optical path length (EL+AL1+AL2+GL+AL3) can be calculated to be approximately 6.686 mm; that is, EL+AL1+AL2+GL+AL3=2.247 mm×1.59731+1.5 mm+0.8 mm+0.2 mm×1.48458+0.5 mm=6.686 mm.

Then, according to the present disclosure, based on the features that the compensating optical path length (FL) is substantially equal to the compensated optical path length (EL+AL1+AL2+GL+AL3), and the refractive index of the light guide component 20 is 1.45190 corresponding to the center wavelength 0.88 μm of the light beam LF, a physical length PFL of the light guide component 20 can be obtained as 4.605 mm by using the equation of FL=EL+AL1+AL2+GL+AL3=6.686 mm; that is, FL=PFL×1.45190=6.686 mm, so PFL=6.686 mm/1.45190=4.605 mm.

Lastly, based on the calculated value (which is 4.605 mm) of the physical length PFL of the light guide component 20, a physical length of the collimation part CP can be simulated as 0.804 mm.

In this embodiment, since a physical length of the first GRIN lens 31 is half of the physical length of the collimation part CP, the physical length of the first GRIN lens 31 is 0.402 mm. In addition, since a physical length of the first part 321 of the second GRIN lens 32 is half of the physical length of the collimation part CP, and a physical length of the second part 322 of the second GRIN lens 32 is the physical length of the focusing part FP, a physical length of the second GRIN lens 32 is 2.649 mm (i.e., 0.402 mm+2.247 mm=2.649 mm).

The arrangements of the above example of the common path interferometric probe 1d ensure that in the whole wavelength range between 0.88±0.04 μm of the light beam LF, the effect of fully (or nearly fully) optical path length compensation can be achieved.

In specific, regarding one of the boundary wavelengths (0.92 μm) of the light beam LF, the compensated optical path length (EL+AL1+AL2+GL+AL3) thereof is approximately 6.684 mm (i.e., 2.247 mm×1.59642+1.5 mm+0.8 mm+0.2 mm×1.48408+0.5 mm=6.684 mm), and the compensating optical path length (FL) thereof is approximately 6.684 mm (i.e., 4.605 mm×1.45147=6.684 mm), and thus, a difference between the compensating optical path length (FL) and the compensated optical path length (EL+AL1+AL2+GL+AL3) is 0. Accordingly, for the boundary wavelength of 0.92 μm of the light beam LF in the common path interferometric probe 1d, the effect of fully optical path length compensation can also be achieved.

On the other hand, regarding the other of the boundary wavelengths (0.84 μm) of the light beam LF, the compensated optical path length (EL+AL1+AL2+GL+AL3) thereof is approximately 6.688 mm (i.e., 2.247 mm×1.59834+1.5 mm+0.8 mm+0.2 mm×1.48515+0.5 mm=6.688 mm), and the compensating optical path length (FL) thereof is approximately 6.689 mm (i.e., 4.605 mm×1.45266=6.689 mm), and thus, a difference between the compensating optical path length (FL) and the compensated optical path length (EL+AL1+AL2+GL+AL3) is 0.001 mm, which is much smaller than the working distance (i.e., AL1+AL2+GL+AL3=1.5 mm+0.8 mm+0.2 mm×1.48458+0.5 mm=3.097 mm) of the common path interferometric probe 1d. Accordingly, for the boundary wavelength of 0.84 μm of the light beam LF in the common path interferometric probe 1d, the effect of nearly fully optical path length compensation can also be achieved.

By the above arrangements, the common path interferometric probe 1d as described in this embodiment realizes that the optical path length FL of the light beam LF traveling through the light guide component 20 is substantially equal to the optical path length (EL+AL1+AL2+GL+AL3) of the sample beam LS traveling from the interface between the collimation part CP and the focusing part FP to the sample 9; that is, the compensating optical path length (FL) is substantially equal to the compensated optical path length (EL+AL1+AL2+GL+AL3). It should be noted that said compensating optical path length (FL) being substantially equal to the compensated optical path length (EL+AL1+AL2+GL+AL3) refers to that a difference between the compensating optical path length (FL) and the compensated optical path length (EL+AL1+AL2+GL+AL3) is much smaller than the optical path length (i.e., working distance) from the common path interferometric probe 1d to the sample 9, and said "much smaller than" used herein refers to that a value is smaller than another value by two orders of magnitude (i.e., differing by a hundred times).

In the descriptions of the above embodiments, said "perpendicular" refers to two components which are substantially perpendicular to each other, said "parallel" refers to two components which are substantially parallel to each other, and there can be some degree of deviations due to, for example, manufacturing deviations.

According to the common path interferometric probes as described above, by disposing the beamsplitter surface in the collimation part and substantially at half length of the collimation part, a part of the light beam is reflected by the beamsplitter surface to form the reference beam, and another part of the light beam passes through the beamsplitter surface to form the sample beam. The reference beam can travel back to the light transceive end facet in an original path by undergoing reflection at the reflection surface, and the sample beam can travel back to the light transceive end facet in another original path by undergoing reflection at the sample. Therefore, in a design phase, the physical lengths of the light guide component and the GRIN lens component can be adjusted so as to ensure that the optical path lengths of the reference beam and the sample beam are substantially equal to each other, and the reference beam and the sample beam can be both focuses on the light transceive end facet after being reflected, thereby ensuring the reference beam and sample beam collection efficiency, achieving the purposes of effectively compensating the compensated optical path length of the sample beam and effectively focusing the focusing spot of the reference beam on the core end facet. As a result, stable and consistent tomographic images of tissues can still be provided under handheld or dynamic operations, which is helpful for medical staff to determine the states of tissues or samples more precisely, and saving more time and human resources.

Furthermore, by disposing the beamsplitter surface substantially at half length of the collimation part, the position relations of the compensated optical path length and the compensating optical path length with respect to the light guide component and the GRIN lens component in the common path interferometric probe can be effectively determined, so that the physical length of the light guide component can be easily determined based on the physical length of the focusing part and the working distance of the common path interferometric probe, and the physical length of the collimation part can be obtained by simulation based on the physical length of the light guide component, thereby easily achieving the purpose of effectively compensating the compensated optical path length of the sample beam.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A common path interferometric probe for identifying a sample, and the common path interferometric probe comprising:
    an optical fiber having a light transceive end facet, and the optical fiber configured to output a light beam through the light transceive end facet;
    a light guide component configured to transmit the light beam and having a first connection end surface and a second connection end surface opposite to each other, and the light transceive end facet of the optical fiber being connected to the first connection end surface;
    a GRIN lens component configured to focus the light beam and comprising a collimation part and a focusing part connected to each other, the focusing part located farther away from the light guide component than the collimation part to the light guide component, the GRIN lens component having a joint surface located at one side of the collimation part located farthest away from the focusing part, and the joint surface connected to the second connection end surface of the light guide component;
    a reflection surface disposed on the first connection end surface of the light guide component and located on one side of the light transceive end facet, and the reflection surface configured to reflect a reference beam; and
    a beamsplitter surface disposed in the collimation part and substantially located at half length of the collimation part, the beamsplitter surface and the reflection surface disposed facing each other, and the beamsplitter surface configured to reflect the reference beam and allow a sample beam to pass through;

wherein when the light beam output from the light transceive end facet of the optical fiber travels through the light guide component and reaches the beamsplitter surface, a part of the light beam is reflected by the beamsplitter surface to form the reference beam, and another part of the light beam passes through the beamsplitter surface to form the sample beam; the reference beam travels back to the light transceive end facet by undergoing reflections respectively at the reflection surface and the beamsplitter surface, and the sample beam reaches the sample after traveling through the GRIN lens component, and is reflected by the sample to travel back to the light transceive end facet.

2. The common path interferometric probe according to claim 1, wherein the reference beam is a collimated light beam having parallel rays traveling toward the reflection surface after leaving the collimation part, then the reference beam is reflected by the reflection surface to travel back to the beamsplitter surface, and then the reference beam is reflected by the beamsplitter surface and focused by the collimation part on the light transceive end facet;
    wherein the sample beam is focused on the sample by the GRIN lens component, then the sample beam is reflected by the sample to travel through the GRIN lens component, and then the sample beam passes through the beamsplitter surface and is focused on the light transceive end facet.

3. The common path interferometric probe according to claim 1, wherein an optical path length of the light beam traveling through the light guide component is substantially equal to an optical path length of the sample beam traveling from an interface between the collimation part and the focusing part to the sample.

4. The common path interferometric probe according to claim 1, wherein the light transceive end facet of the optical fiber is connected to a paraxial region of the first connection end surface of the light guide component, the reflection surface is an annular reflection surface located at an off-axis region of the first connection end surface, and the reflection surface surrounds the light transceive end facet.

5. The common path interferometric probe according to claim 1, further comprising a cover glass disposed between the GRIN lens component and the sample.

6. The common path interferometric probe according to claim 1, further comprising a light folding component disposed between the GRIN lens component and the sample, wherein the light folding component is configured to fold the sample beam.

7. The common path interferometric probe according to claim 1, wherein the GRIN lens component comprises a first GRIN lens and a second GRIN lens which are coaxially arranged and connected to each other, the second GRIN lens is located farther away from the light guide component than the first GRIN lens to the light guide component, the joint surface is located at one side of the first GRIN lens located farthest away from the second GRIN lens, a connection surface is located between the first GRIN lens and the second GRIN lens, and the beamsplitter surface is disposed on the connection surface;
    wherein the second GRIN lens comprises a first part and a second part which are connected to each other, the first part is connected to the first GRIN lens, an axial length of the first part is substantially equal to an axial length of the first GRIN lens, and the collimation part is composed of the first part and the first GRIN lens.

8. The common path interferometric probe according to claim 7, wherein the beamsplitter surface is formed by a coating with which the connection surface is entirely coated, and a reflectivity of the beamsplitter surface is larger than or equal to 4% and smaller than or equal to 50%.

9. The common path interferometric probe according to claim 7, wherein the beamsplitter surface has a light transmission region and a reflection region, the light transmission region is at least located at a paraxial region of the beamsplitter surface, and the reflection region is located at an off-axis region of the beamsplitter surface;
    wherein a part of the light beam reaching the reflection region is reflected by the reflection region to form the reference beam, and another part of the light beam reaching the light transmission region passes through the light transmission region to form the sample beam.

10. The common path interferometric probe according to claim 9, wherein the reflection region of the beamsplitter surface is an annular reflection surface, and the reflection region surrounds the light transmission region.

11. The common path interferometric probe according to claim 1, wherein the GRIN lens component comprises a wide part and a narrow part which are made of a single piece, an outer diameter of the wide part is larger than an outer diameter of the narrow part, the narrow part is located farther away from the light guide component than the wide part to the light guide component, the joint surface is located at one side of the wide part located farthest away from the narrow part, the narrow part comprises a front part and a rear part which are connected to each other, the front part is connected to the wide part, an axial length of the front part is substantially equal to an axial length of the wide part, the collimation part is composed of the front part and the wide part, the beamsplitter surface has a light transmission region and a reflection region, the light transmission region is located at an interface between the wide part and the narrow part, the wide part has an annular surface surrounding the interface, and the reflection region is located at the annular surface;
    wherein a part of the light beam reaching the reflection region is reflected by the reflection region to form the reference beam, and another part of the light beam reaching the light transmission region passes through the light transmission region to form the sample beam.

12. The common path interferometric probe according to claim 1, further comprising a light folding component and a cover glass, wherein the light folding component is disposed between the GRIN lens component and the sample, the cover glass is disposed between the light folding component and the sample, the light folding component is configured to fold the sample beam, and the cover glass is disposed between the GRIN lens component and the sample.

13. The common path interferometric probe according to claim 12, wherein an optical path length of the light beam traveling through the light guide component is substantially equal to a sum of an optical path length of the sample beam traveling through the focusing part, an optical path length of the sample beam traveling through an air gap between the GRIN lens component and the light folding component, an optical path length of the sample beam traveling through an air gap between the light folding component and the cover glass, and an optical path length of the sample beam traveling through an air gap between the cover glass and the sample.

* * * * *